United States Patent
Asanuma et al.

(10) Patent No.: US 10,392,495 B2
(45) Date of Patent: *Aug. 27, 2019

(54) POLYVINYL ACETAL COMPOSITION (71) Applicant: KURARAY CO., LTD., Kurashiki-shi (JP)

(72) Inventors: Yoshiaki Asanuma, Kurashiki (JP); Yoko Nakano, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/779,179

(22) PCT Filed: Mar. 22, 2013

(86) PCT No.: PCT/JP2013/058440
§ 371 (c)(1),
(2) Date: Sep. 22, 2015

(87) PCT Pub. No.: WO2014/147842
PCT Pub. Date: Sep. 25, 2014

(65) Prior Publication Data
US 2016/0046784 A1 Feb. 18, 2016

(51) Int. Cl.
*C08K 5/103* (2006.01)
*C08J 5/18* (2006.01)
*C08L 71/02* (2006.01)
*B32B 17/10* (2006.01)
*C08L 29/14* (2006.01)

(52) U.S. Cl.
CPC ........ *C08K 5/103* (2013.01); *B32B 17/10605* (2013.01); *B32B 17/10761* (2013.01); *C08J 5/18* (2013.01); *C08L 29/14* (2013.01); *C08L 71/02* (2013.01); *C08J 2329/14* (2013.01); *C08J 2337/00* (2013.01); *C08L 2205/025* (2013.01)

(58) Field of Classification Search
CPC ................ C08L 2205/02; C08L 2205/025
See application file for complete search history.

(56) References Cited

U.S. PATENT DOCUMENTS

| | | | |
|---|---|---|---|
| 3,998,792 | A | 12/1976 | Hermann et al. |
| 5,190,826 | A | 3/1993 | Asahina et al. |
| 2003/0139520 | A1 | 7/2003 | Toyama et al. |
| 2011/0151269 | A1 | 6/2011 | Hatta et al. |
| 2012/0021231 | A1 | 1/2012 | Hirota et al. |
| 2012/0202070 | A1 | 8/2012 | Asanuma et al. |
| 2012/0288722 | A1 | 11/2012 | Iwamoto et al. |

FOREIGN PATENT DOCUMENTS

| | | | |
|---|---|---|---|
| DE | 199 38 159 A1 | | 2/2001 |
| EP | 2 067 813 A1 | | 6/2009 |
| JP | 11323055 A | * | 11/1999 |
| JP | 2002 104878 | | 4/2002 |
| JP | 2002 326844 | | 11/2002 |
| JP | 2011 84468 | | 4/2011 |
| JP | 2011 225449 | | 11/2011 |
| WO | 2010 008053 | | 1/2010 |

OTHER PUBLICATIONS

Machine translation of JA 11323055 A, 1999.*
International Search Report dated Jun. 25, 2013 in PCT/JP13/058440 Filed Mar. 22, 2013.
Extended Search Report dated Oct. 12, 2016 in European Patent Application No. 13879110.8.

* cited by examiner

*Primary Examiner* — Wenwen Cai
(74) *Attorney, Agent, or Firm* — Oblon, McClelland, Maier & Neustadt, L.L.P.

(57) ABSTRACT

A composition including 100 parts by mass of a polyvinyl acetal and 30 to 70 parts by mass of a plasticizer including 0.5 to 100% by mass of a plasticizer containing a polar group and 0 to 99.5% by mass of a plasticizer containing no polar group, a total of the plasticizer containing a polar group and the plasticizer containing no polar group being 100% by mass. When the polyvinyl acetal is analyzed by HPLC using an ODS column having an inner diameter of 4 mm and a length of 1 cm, the polyvinyl acetal exhibits a first peak and a second peak derived from polyvinyl acetals. In addition, a laminated product of a layer including a polyvinyl acetal and a layer including a hydrocarbon-based polymer.

19 Claims, 2 Drawing Sheets

POLYVINYL ACETAL COMPOSITION

TECHNICAL FIELD

The present invention relates to a polyvinyl acetal composition, a sheet thereof, and an application thereof.

BACKGROUND ART

A polyvinyl acetal represented by polyvinyl butyral has excellent adhesion and compatibility with various organic and inorganic substrates, and has excellent solubility in an organic solvent. The polyvinyl acetal is widely used as various adhesives, a binder for ceramics, various inks, paints, and the like, or an interlayer film for safety glass.

Recently, in an application of an interlayer film for laminated glass, various highly functionalized products have been developed. For example, a laminated sound insulation interlayer film for laminated glass is disclosed (for example, refer to Patent Literatures 1 and 2). In the laminated sound insulation interlayer film for laminated glass, in order to impart high sound insulating properties to the interlayer film for laminated glass, a plurality of polyvinyl acetal layers having different compositions is laminated. For example, the polyvinyl acetal layers have different content ratios of a polyvinyl acetal and a plasticizer. In the interlayer film for laminated glass, in general, in order to make amounts of a plasticizer included in the respective layers different from each other, polyvinyl acetals having different average amounts of remaining hydroxyl groups between the respective layers are used.

By the way, in general, an interlayer film for laminated glass is manufactured using an extruder from a viewpoint of production costs thereof. The laminated sound insulation interlayer film for laminated glass is manufactured by a coextrusion method. However, when the interlayer film for laminated glass is manufactured by such a method, a certain amount of trims and an off-spec product which is difficult to be used as a commercial product because of nonuniform composition or thickness are obtained.

In general, a trim or an off-spec product of a monolayer interlayer film for laminated glass can be recycled by introducing the trim or the off-spec product into an extruder again and performing melt kneading and extrusion molding thereof. However, when a mixture of polyvinyl acetal compositions having different compositions as a trim or an off-spec product is used, a resulting interlayer film for laminated glass may be opaque. In particular, in the laminated sound insulation interlayer film for laminated glass, the polyvinyl acetal compositions included in the respective layers include polyvinyl acetals having different average amounts of remaining hydroxyl groups from each other. Therefore, it is difficult to make the polyvinyl acetals compatible with each other. The interlayer film for laminated glass obtained by recycling the trim or the off-spec product generated during manufacturing the interlayer film for laminated glass has a problem of poor transparency.

When a polyvinyl acetal resin is manufactured, a batch type precipitation method has been industrially and widely performed.

In a typical batch type precipitation method, polyvinyl alcohol as a raw material of the polyvinyl acetal resin is dissolved in water. An aldehyde such as butylaldehyde, and an acid catalyst such as hydrochloric acid or nitric acid are added thereto to initiate an acetalization reaction. When an acetalization degree reaches a certain level, partially acetalized polyvinyl alcohol which cannot be dissolved in water precipitates to become particles. Thereafter, the acetalization reaction proceeds in a heterogeneous system in which the particles are dispersed in water. After completion of the reaction, the acid catalyst is appropriately neutralized, washed, and dried to obtain a polyvinyl acetal.

A resin obtained by the batch type precipitation method is preferable because the resin is obtained in a form of particles, and excellent in purification by washing the resulting resin with water and in a handling property of the resin after drying. Meanwhile, because of the batch reaction, even when production conditions are the same, average acetalization degrees of the resulting polyvinyl acetals may vary between the batches (that is, an average amount of remaining hydroxyl groups (mol %) may be different between the batches). When two or more kinds of polyvinyl acetals having average acetalization degrees different from each other by a certain degree or more, because of such a variation between the batches, are mixed with a plasticizer generally used for a polyvinyl acetal, such as triethylene glycol di-2-ethylhexanoate (3GO), to be used, transparency of a resulting composition may be lowered.

As described above, the acetalization reaction after particle precipitation proceeds in a heterogeneous system. Therefore, in some reaction methods, a polyvinyl acetal having a relatively wide distribution of the acetalization degree even in the same batch (that is, variation of an amount of the remaining hydroxyl groups (mol %) in a batch is large) may be obtained. Particularly, when the acetalization reaction is performed in such a reaction condition as to increase a particle diameter of a polyvinyl acetal, there is a difference in an aldehyde concentration and an acid catalyst concentration between the inside and the outside of the particles during the reaction. Therefore, the polyvinyl acetal having a relatively wide distribution of the acetalization degree even in the same batch tends to be obtained. When the polyvinyl acetal having a relatively wide distribution of the acetalization degree even in the same batch is mixed with 3GO, transparency of a resulting composition may be lowered. Particularly, laminated glass including, as an interlayer film, a sheet made from a composition may be clouded under irradiation with light, the composition being obtained by mixing the polyvinyl acetal having a relatively wide distribution of the acetalization degree in the same batch and a plasticizer generally used for a polyvinyl acetal, such as 3GO. An application thereof in exposure to strong light, for example, an application thereof to a windshield of a car (exposed to a headlight from an oncoming car during driving at night) is difficult.

CITATION LIST

Patent Literature

Patent Literature 1: JP 2011-225449 A
Patent Literature 2: JP 2011-084468 A

SUMMARY OF INVENTION

Technical Problem

The present invention solves the above-described problems. An object of the present invention is to provide a composition including polyvinyl acetals having different average amounts of remaining hydroxyl groups and being able to mold a sheet having excellent transparency.

Solution to Problem

According to the present invention, the above-described object can be achieved by providing a composition including 100 parts by mass of a polyvinyl acetal and 30 to 70 parts by mass of a plasticizer including 0.5 to 100% by mass of a plasticizer containing a polar group and 0 to 99.5% by mass of a plasticizer containing no polar group, a total of the plasticizer containing a polar group and the plasticizer containing no polar group being 100% by mass. When the polyvinyl acetal is analyzed by high performance liquid chromatography (HPLC) using a column (ODS column) having an inner diameter of 4 mm and a length of 1 cm, the polyvinyl acetal exhibits a first peak and a second peak derived from polyvinyl acetals. The column (ODS column) is filled with spherical silica gel surface-modified with an octadecylsilyl group, serving as a stationary phase.

A difference in elution time between the first peak and the second peak is preferably 2 to 10 minutes.

The first peak is preferably exhibited at less than 22 minutes of the elution time. The second peak is preferably exhibited at 22 minutes or more of the elution time.

A ratio between a square root of an area of a mountain with the first peak and a square root of an area of a mountain with the second peak is preferably 20:80 to 98:2.

When, among the mountains with the peaks derived from polyvinyl acetals, of the mountains with the largest area and the second largest area, the peak included in the mountain in which the elution time of the peak is less is referred to as the first peak, and the peak included in the other mountain is referred to as the second peak, the sum of the square root of the area of the mountain with the first peak and the square root of the area of the mountain with the second peak is preferably 50 to 100% with respect to the sum of the square roots of the areas of the mountains with the peaks derived from polyvinyl acetals.

When a solution obtained by dissolving 1 g of a polyvinyl acetal in 100 g of ethanol is titrated with hexane, a dropping amount of hexane until the solution becomes clouded is preferably 140 mL or more.

When the solution obtained by dissolving 1 g of a polyvinyl acetal in 100 g of ethanol is titrated with deionized water, a dropping amount of deionized water until the solution becomes clouded is preferably 10 mL or more.

The plasticizer containing a polar group is preferably a compound containing a hydroxyl group.

The plasticizer containing a polar group is preferably a compound having a molecular weight of 200 to 2000.

The compound containing a hydroxyl group preferably has a number average molecular weight based on a hydroxyl value of 200 to 2000.

The compound containing a hydroxyl group is preferably an ester compound.

The ester compound is preferably a polyester compound.

The compound containing a hydroxyl group is preferably an ether compound.

The ether compound is preferably a polyether compound.

The plasticizer preferably includes a compound containing a hydroxyl group in an amount of 0.5 to 5% by mass, and a diester compound of a monovalent carboxylic acid and a compound selected from triethylene glycol and tetraethylene glycol, containing no polar group, in an amount of 70 to 99.5% by mass.

The polyvinyl acetal is preferably a mixture of polyvinyl acetal (A) and polyvinyl acetal (B) having different average amounts of remaining hydroxyl groups.

When the average amount of remaining hydroxyl groups of polyvinyl acetal (A) is X mol % and the average amount of remaining hydroxyl groups of polyvinyl acetal (B) is Y mol %, preferably $|X-Y| \geq 1$.

Preferably, $X=27.0$ to $33.0$, $Y=15.0$ to $27.0$, and the polyvinyl acetal satisfies definition 1.

Definition 1: When 1 g of a polyvinyl acetal is dissolved in 100 g of methanol, an undissolved content is 2.5 to 90% by mass.

Preferably, $X=27.0$ to $33.0$, $Y=33.0$ to $50.0$, and the polyvinyl acetal satisfies definition 2.

Definition 2: When 1 g of a polyvinyl acetal is dissolved in 100 g of chloroform, an undissolved content is 5 to 70% by mass.

Preferably, $X=15.0$ to $27.0$, $Y=33.0$ to $50.0$, and the polyvinyl acetal satisfies definitions 1 and 2.

Definition 1: When 1 g of a polyvinyl acetal is dissolved in 100 g of methanol, an undissolved content is 2.5 to 90% by mass.

Definition 2: When 1 g of a polyvinyl acetal is dissolved in 100 g of chloroform, an undissolved content is 5 to 70% by mass.

The mixing ratio by mass of polyvinyl acetal (A) and polyvinyl acetal (B) is preferably 20:80 to 98:2.

The average amount of remaining hydroxyl groups of the polyvinyl acetal is preferably 20 to 33 mol %.

The present invention relates to a sheet made from the above-described composition.

The present invention relates to laminated glass including the above-described sheet.

The present invention relates to laminated glass having haze of 0.01 to 2%.

Advantageous Effects of Invention

The composition of the present invention includes, as an essential component, a polyvinyl acetal exhibiting at least two peaks derived from polyvinyl acetals when the composition of the present invention is analyzed by HPLC using a column (ODS column) having an inner diameter of 4 mm and a length of 1 cm. The column (ODS column) is filled with spherical silica gel surface-modified with an octadecylsilyl group, serving as a stationary phase. The ODS column includes porous spherical silica gel surface-modified with an octadecyl group as a filler. The octadecyl group performs a hydrophobic interaction with a hydrophobic group of an analysis target compound. Therefore, it is possible to separate compounds in retention time (elution time) depending on a polarity of the analysis target compound. The less the elution time is, the higher the polarity of the analysis target compound is. That is, the polyvinyl acetal exhibiting the first peak and the second peak derived from polyvinyl acetals when the polyvinyl acetal is analyzed by HPLC using an ODS column having an inner diameter of 4 mm and a length of 1 cm, indicates that the polyvinyl acetal includes at least two kinds of polyvinyl acetals having different polarities corresponding to the respective peaks. When the polyvinyl acetals having different polarities, for example, polyvinyl acetals including polyvinyl acetal molecules having different amounts of remaining hydroxyl groups are mixed with a compound generally used as a plasticizer for a polyvinyl acetal, such as triethylene glycol di-2-ethylhexanoate, a composition having poor transparency may be obtained. The composition of the present invention includes, as an essential component, a plasticizer including 0.5 to 100% by mass of a plasticizer containing a polar group. The plasticizer containing a polar group can make polyvinyl acetal molecules having different amounts of remaining hydroxyl groups compatible with each other or can disperse the polyvinyl acetal molecules microscopically to a level having no influence on transparency. Therefore, it is estimated that a transparent composition can be obtained as a result. Therefore, the composition of the present invention is a plasticized polyvinyl acetal composition having excellent transparency, even when particularly a trim generated in manufacturing a laminated interlayer film by extrusion molding, or polyvinyl acetals having different polarities such as polyvinyl acetals having a variation in the acetalization degree between the batches or in the batch are used as a raw material. It is possible to mold a sheet having excellent transparency from the composition.

DESCRIPTION OF EMBODIMENTS

Figure 1:
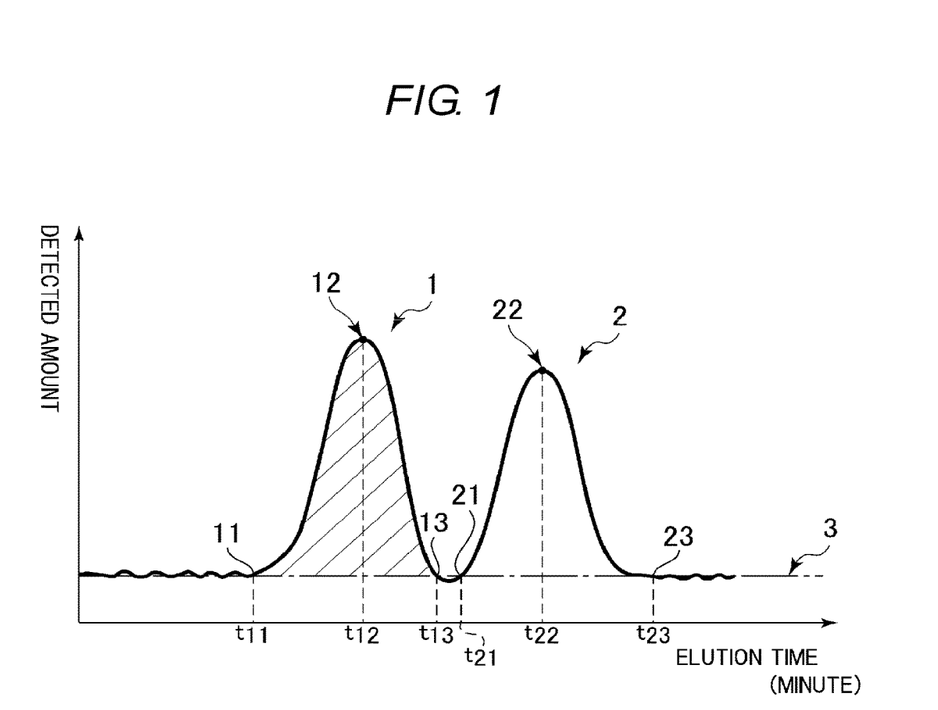
FIG. 1 illustrates an example of HPLC analysis chart (chromatogram).

First, a polyvinyl acetal used in the present invention will be explained. The polyvinyl acetal used in the present invention is not particularly limited as long as the polyvinyl acetal exhibits a first peak and a second peak derived from polyvinyl acetals in HPLC analysis chart produced based on a detected amount obtained from a detector when the polyvinyl acetal is analyzed by HPLC using an ODS column having an inner diameter of 4 mm and a length of 1 cm. FIG. 1 illustrates an example of HPLC analysis chart. The first peak and the second peak are as follows. That is, among the mountains with the peaks derived from polyvinyl acetals, detected in the HPLC analysis chart in the present invention, of the mountains with the largest area and the second largest area, the peak included in the mountain in which the elution time of the peak is less is referred to as the first peak, and the peak included in the other mountain is referred to as the second peak.

Examples of an HPLC device used to identify the polyvinyl acetal of the present invention include a high pressure gradient HPLC system "Prominence" manufactured by Shimadzu Corporation. Examples of the ODS column include "Shim-pack G-ODS (4) (inner diameter 4 mm×length 1 cm)" manufactured by Shimadzu Corporation. However, an arbitrary HPLC device or an arbitrary ODS column can be used as long as the device or the column is equivalent to the above-described device or column. A filler of the ODS column may have any particle diameter. However, for example, a filler having a particle diameter of 1 to 10 μm is used. As the detector, for example, an evaporative light scattering detector "ELSD-LTH" manufactured by Shimadzu Corporation, or a device equivalent thereto can be used.

(HPLC Analysis)

In the present invention, HPLC analysis is performed by the following method. While an inside of an HPLC system is filled with a mixed solvent (ethanol/water=4/1 (v/v)) (hereinafter, referred to as a mobile phase (A)), a 30 μL of an ethanol solution including 0.5% by mass of a polyvinyl acetal is injected as a sample. At a column temperature of 45° C. at a flow rate of 0.4 mL/min, the ratio of ethanol in the mobile phase is increased at a constant speed (5 vol %/min.) over 20 minutes from immediately after the injection of the sample. On and after 20 minutes (at this time, mobile phase (A) is completely replaced with ethanol), ethanol alone is used as a mobile phase.

Next, the HPLC analysis chart (chromatogram) of the polyvinyl acetal used in the present invention will be described with reference to FIG. 1. In the HPLC analysis chart, the vertical axis represents a detected amount and the horizontal axis represents elution time. A first peak 12 and a second peak 22 derived from polyvinyl acetals are exhibited. A difference in the elution time between the peaks 12 and 22 is preferably 2 to 10 minutes, more preferably 2 to 8 minute, still more preferably 2 to 6 minute. When the difference in the elution time is larger than 10 minutes, transparency of a resulting composition may be lowered. The peak in this specification means a maximum point of the detected amount in each mountain.

In the polyvinyl acetal used in the present invention, the first peak 12 is exhibited in less than 22 minutes of the elution time, preferably in less than 21.8 minutes thereof, more preferably in less than 21.6 minutes thereof. In addition, the second peak 22 is exhibited in 22 minutes or more of the elution time, preferably in 22.2 minutes or more thereof, more preferably in 22.4 minutes or more thereof. When the elution time $t_{12}$ of the first peak 12 is less than 22 minutes and the elution time $t_{22}$ of the second peak 22 is 22 minutes or more, a sheet having excellent mechanical strength and excellent adhesion to glass tends to be obtained. A mountain with a peak having elution time of less than 22 minutes usually represents a polyvinyl acetal containing about 30 mol % or more of remaining hydroxyl groups. A mountain with a peak having elution time of 22 minutes or more usually represents a polyvinyl acetal containing about 20 mol % or less of remaining hydroxyl groups.

Figure 2:
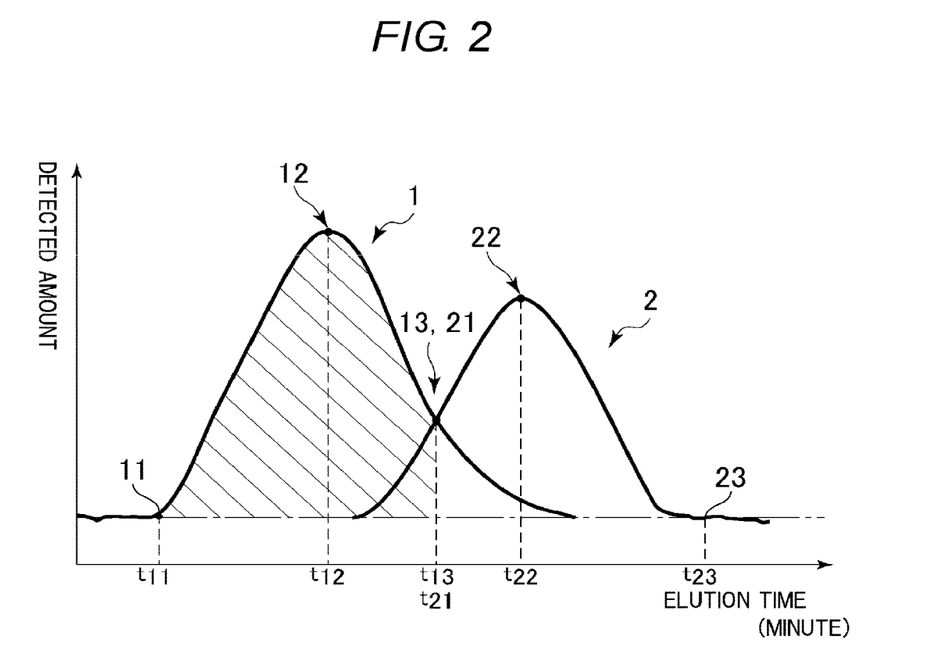
FIG. 2 illustrates an example of HPLC analysis chart (chromatogram).

In the polyvinyl acetal used in the present invention, a ratio between a square root of an area of the mountain with the first peak 12 and a square root of an area of the mountain with the second peak 22 is preferably 20:80 to 98:2, more preferably 30:70 to 97:3, still more preferably 50:50 to 95:5, particularly preferably 50:50 to 90:10. The ratio between the square root of the area of the mountain with the first peak 12 and the square root of the area of the mountain with the second peak 22 is preferably within this range from a viewpoint of obtaining a composition having excellent transparency. The area of a mountain with a peak is obtained by, in the HPLC analysis chart, integrating detected amounts from the elution time at the intersection between the baseline and a mountain immediately before the elution time corresponding to a peak until the elution time at the intersection between the baseline and a mountain immediately after the elution time corresponding to the peak. For example, the area of a mountain with the first peak 12 means a value obtained by integrating the detected amounts from elution time $t_{11}$ at the intersection 11 between the baseline and the mountain with a peak immediately before the first peak 12 until elution time $t_{13}$ at the intersection 13 between the baseline and the mountain with a peak 12 immediately after the first peak 12. That is, in FIG. 1, the area means an area of a hatched portion. Similarly, for example, the area of a mountain with the second peak 22 means a value obtained by integrating the detected amounts from elution time $t_{21}$ at the intersection 21 between the baseline and the mountain with a peak 22 immediately before the second peak 22 until elution time $t_{23}$ at the intersection 23 between the baseline and the mountain with a peak immediately after the second peak 22. It is experimentally confirmed that an actual ratio of the polyvinyl acetal contents is not the ratio of the areas of the mountains with the peaks, but approximately the same as a ratio of square roots of the areas of the mountains with the peaks (square roots of peak areas). When the mountain with the peak 12 and the mountain with the peak 22 overlap each other, as in FIG. 2, the elution time at the intersection of the mountains are referred to as $t_{13}$ and $t_{21}$, respectively, and the areas of the mountains similar to the above-described mountains are calculated.

In the polyvinyl acetal used in the present invention, the sum of the square root of the area of the mountain with the first peak 12 and the square root of the area of the mountain with the second peak 22 is preferably 50 to 100% with respect to the sum of the square roots of all the areas of the mountains with the peaks derived from polyvinyl acetals. The sum of the square roots of the areas of the mountains with the first peak 12 and the second peak 22 is preferably within this range with respect to the sum of the square roots of all the areas of the mountains with the peaks, from viewpoints of transparency and mechanical strength of a resulting composition.

Such a polyvinyl acetal as follows is preferably used as the polyvinyl acetal of the present invention. That is, when a solution obtained by dissolving 1 g of the polyvinyl acetal in 100 g of ethanol is titrated with hexane at 23° C., a dropping amount of hexane until the solution becomes clouded is preferably 140 mL or more, more preferably 150 mL or more, particularly preferably 160 mL or more. A polyvinyl acetal having a dropping amount of hexane of less than 140 mL includes a polyvinyl acetal molecule having a low affinity with hexane (low-polarity solvent) and having a large amount of remaining hydroxyl groups. Such a polyvinyl acetal molecule has low compatibility with a plasticizer or the like used in the present invention. Therefore, a sheet molded from a resulting composition may have poor transparency.

Such a polyvinyl acetal as follows is preferably used as the polyvinyl acetal of the present invention. That is, when a solution obtained by dissolving 1 g of the polyvinyl acetal in 100 g of ethanol is titrated with deionized water at 23° C., a dropping amount of deionized water until the solution becomes clouded is preferably 10 mL or more, more preferably 20 mL or more, still more preferably 23 mL or more, particularly preferably 25 mL or more. A polyvinyl acetal having a dropping amount of deionized water of less than 10 mL includes a polyvinyl acetal molecule having a low affinity with water (high-polarity solvent) and having a small amount of remaining hydroxyl groups. Such a polyvinyl acetal molecule has low compatibility with a plasticizer or the like used in the present invention. Therefore, a sheet molded from a resulting composition may have poor transparency.

The polyvinyl acetal used in the present invention preferably satisfies the following definition 1 and/or definition 2.

Definition 1: When 1 g of a polyvinyl acetal is dissolved in 100 g of methanol, an undissolved content is 2.5 to 90% by mass.

Definition 2: When 1 g of a polyvinyl acetal is dissolved in 100 g of chloroform, an undissolved content is 5 to 70% by mass.

In definition 1, the phrase "When 1 g of a polyvinyl acetal is dissolved in 100 g of methanol, an undissolved content is 2.5 to 90% by mass." means the following. That is, 1 g of a polyvinyl acetal having a major axis of each particle or each lump of 3 mm or less is added to 100 g of methanol such that the polyvinyl acetal does not become agglomerated while the methanol is stirred. After a treatment at 25° C. for 72 hours, a resulting solution (including an undissolved fragment) is subjected to filtration under reduced pressure at a differential pressure of 0.010±0.002 MPa using filter paper classified into five A defined in JIS P3801. At this time, a dry mass of components remaining on the filter paper is 0.025 to 0.90 g (that is, 2.5 to 90% by mass). When 1 g of a polyvinyl acetal is dissolved in 100 g of methanol, the undissolved content is preferably 5 to 90% by mass, more preferably 10 to 90% by mass, still more preferably 70 to 90% by mass. In a polyvinyl acetal having the undissolved content of less than 2.5% by mass or a polyvinyl acetal having the undissolved content of larger than 90% by mass, such a problem to be solved by the present invention that a sheet having poor transparency and clouded when being used for laminated glass is obtained in a recycling process, hardly occurs. In the recycling process, a transparent sheet is obtained using a trim of a multilayer interlayer film having different amounts of remaining hydroxyl groups or an off-spec product as a raw material. The transparent sheet is one of the objects of the present invention. However, in this range, a usable polyvinyl acetal is limited, and a recycling efficiency may be lowered. When the major axis of each particle or each lump of the polyvinyl acetal used in the present invention is larger than 3 mm, the polyvinyl acetal is treated by such a method as not to change the composition thereof, for example, by cutting the particles or the lumps with scissors, and the polyvinyl acetal including a particle or a lump having a major axis of 3 mm or less may be used.

The above-described filtration of the solution (including an undissolved fragment) obtained by dissolving 1 g of a polyvinyl acetal in 100 g of methanol at 25° C. is performed in the following manner. A Buchner funnel is attached to a suction bottle of an appropriate size to set the filter paper thereto. The filter paper is impregnated with methanol in advance. The solution (including an undissolved fragment) is poured onto the filter paper and is subjected to suction filtration under reduced pressure using an aspirator or the like (differential pressure 0.010±0.002 MPa). When 95% or more of the poured solution is filtered, 100 mL of methanol is further poured onto the filter paper, and the undissolved fragment remaining on the filter paper is washed. When the filtrate stops coming out, a solid on the filter paper is collected. Methanol remaining in the solid is dried under reduced pressure (−0.095 to −0.097 MPa, room temperature, 24 hours). Thereafter, a weight is measured and a ratio (percentage) of the undissolved fragment is calculated. The ratio of the undissolved fragment is calculated by (weight of undissolved fragment [g]/weight of sample added to methanol [g])×100. The polyvinyl acetal satisfying definition 1 has a small amount of remaining hydroxyl groups, and therefore, includes a specific amount of polyvinyl acetal molecules to be hardly dissolved in methanol and a specific amount of polyvinyl acetal molecules to be dissolved in methanol.

In definition 2, the phrase "When 1 g of a polyvinyl acetal is dissolved in 100 g of chloroform, an undissolved content is 5 to 70% by mass." means the following. That is, in the above-described method of measuring the undissolved content when 1 g of a polyvinyl acetal is dissolved in 100 g of methanol in definition 1, the ratio of the undissolved fragment is 5 to 70% by mass when chloroform is used in place of methanol. The undissolved content in definition 2 is preferably 7 to 70% by mass, more preferably 10 to 70% by mass, still more preferably 20 to 70% by mass. In a polyvinyl acetal having the undissolved content of less than 5% by mass or a polyvinyl acetal having the undissolved content of larger than 70% by mass, such a problem to be solved by the present invention that a sheet having poor transparency and clouded when being used for laminated glass is obtained in a recycling process, hardly occurs. In the recycling process, a transparent sheet is obtained using a trim of a multilayer interlayer film having different amounts of remaining hydroxyl groups or an off-spec product as a raw material. The transparent sheet is one of the objects of the present invention. However, in this range, a usable polyvinyl acetal is limited, and a recycling efficiency may be lowered. The polyvinyl acetal satisfying definition 2 has a large amount of remaining hydroxyl groups, and therefore, includes a specific amount of polyvinyl acetal molecules to be hardly dissolved in chloroform and a specific amount of polyvinyl acetal molecules to be dissolved in chloroform.

The polyvinyl acetal used in the present invention exhibits the first peak and the second peak derived from polyvinyl acetals in the HPLC analysis. The polyvinyl acetal used in the present invention can be prepared by various methods. Examples of the polyvinyl acetal used in the present invention include the following. That is, a mixture of polyvinyl acetal (A) and polyvinyl acetal (B) having different average amounts of remaining hydroxyl groups, in which when a solution of 1 g of the polyvinyl acetal dissolved in 100 g of ethanol is titrated with hexane or deionized water, the solution becomes clouded with a dropping amount in a predetermined amount or more, or in which definition 1 and/or definition 2 are/is further satisfied. Alternatively, a polyvinyl acetal having a large variation between the batches, in which when a solution of 1 g of the polyvinyl acetal dissolved in 100 g of ethanol is titrated with hexane or deionized water, the solution becomes clouded with a dropping amount in a predetermined amount or more, or in which definition 1 and/or definition 2 are/is further satisfied.

When a mixture of polyvinyl acetal (A) and polyvinyl acetal (B) having different average amounts of remaining hydroxyl groups is used as the polyvinyl acetal of the present invention, the polyvinyl acetal to be used is not particularly limited unless contrary to the gist of the present invention. From a viewpoint of achieving the object of the present invention to obtain a transparent composition and a sheet using the composition and having excellent transparency from a polyvinyl acetal which cannot obtain a transparent composition in combination with a general-purpose plasticizer, a polyvinyl acetal satisfying the following is particularly preferable. That is, when the amount of remaining hydroxyl groups of polyvinyl acetal (A) is X mol %, and the amount of remaining hydroxyl groups of polyvinyl acetal (B) is Y mol %, $|X-Y| \geq 1$, preferably $|X-Y| \geq 3$, more preferably $|X-Y|$ is $\geq 5$.

X and Y are not particularly limited unless contrary to the gist of the present invention. However, from viewpoints of availability, mechanical strength and moldability of the resulting composition, and the like, X=27.0 to 33.0, preferably 27.0 to 32.5, more preferably 27.0 to 32.0, Y=15.0 to 27.0, preferably 16.0 to 27.0, more preferably 17.0 to 27.0, and when a polyvinyl acetal obtained by mixing polyvinyl acetal (A) and polyvinyl acetal (B) is analyzed by HPLC using an ODS column having an inner diameter of 4 mm and a length of 1 cm, the polyvinyl acetal preferably exhibits a first peak and a second peak derived from polyvinyl acetals. From similar viewpoints, X=27.0 to 33.0, preferably 27.5 to 33.0, more preferably 28.0 to 33.0, Y=33.0 to 50.0, preferably 33.0 to 45.0, more preferably 33.0 to 41.0, and when a polyvinyl acetal obtained by mixing polyvinyl acetal (A) and polyvinyl acetal (B) is analyzed by HPLC using an ODS column having an inner diameter of 4 mm and a length of 1 cm, the polyvinyl acetal preferably exhibits a first peak and a second peak derived from polyvinyl acetals. From similar viewpoints, X=15.0 to 27.0, preferably 16.0 to 27.0, more preferably 17.0 to 27.0, Y=33.0 to 50.0, preferably 33.0 to 45.0, more preferably 33.0 to 41.0, and when a polyvinyl acetal obtained by mixing polyvinyl acetal (A) and polyvinyl acetal (B) is analyzed by HPLC using an ODS column having an inner diameter of 4 mm and a length of 1 cm, the polyvinyl acetal preferably exhibits a first peak and a second peak derived from polyvinyl acetals.

When a mixture of polyvinyl acetal (A) and polyvinyl acetal (B) is used as the polyvinyl acetal, a mixing ratio thereof is not particularly limited. However, the mixing ratio by mass of polyvinyl acetal (A) and polyvinyl acetal (B) may be 20:80 to 98:2, preferably 30:70 to 97:3, more preferably 50:50 to 95:5, still more preferably 50:50 to 90:10. By mixing polyvinyl acetal (A) and polyvinyl acetal (B) in such a ratio, a composition having excellent transparency is obtained, and a sheet having excellent transparency can be molded using the composition. Therefore, it is possible to increase a recycling efficiency of the laminated interlayer film.

The average amount of remaining hydroxyl groups of the polyvinyl acetal used in the present invention is preferably 20 to 33 mol %, more preferably 23 to 32.5 mol %, still more preferably 27 to 32.0 mol %. When a mixture of polyvinyl acetal (A) and polyvinyl acetal (B) is used, the average amount of remaining hydroxyl groups of the polyvinyl acetal after mixing is preferably in the above-described range. When the polyvinyl acetal having the average amount of remaining hydroxyl groups in the range is used, a composition having excellent transparency is obtained, and a sheet using the composition and having excellent transparency is obtained.

The polyvinyl acetal used in the present invention, polyvinyl acetal (A), and polyvinyl acetal (B) are usually manufactured using polyvinyl alcohol as a raw material. The polyvinyl alcohol can be obtained by a conventionally known method, that is, by polymerizing a vinyl ester compound and saponifying the resulting polymer. As a method for polymerizing a vinyl ester compound, it is possible to use a conventionally known method such as a solution polymerization method, a bulk polymerization method, a suspension polymerization method, or an emulsion polymerization method. As a polymerization initiator, an azo initiator, a peroxide initiator, a redox initiator, or the like can be appropriately selected in accordance with the polymerization method. An alcoholysis or hydrolysis using a conventionally known alkali catalyst or acid catalyst is applicable to the saponification reaction. Among these, a saponification reaction using methanol as a solvent and using caustic soda (NaOH) as a catalyst is easy and most preferable.

Examples of the vinyl ester compound include a conventionally known vinyl carboxylate such as vinyl formate, vinyl acetate, vinyl propionate, vinyl butyrate, vinyl stearate, or vinyl benzoate. Particularly, vinyl acetate is preferable.

Unless contrary to the gist of the present invention, as the polyvinyl alcohol, modified polyvinyl alcohol obtained by copolymerizing the vinyl ester compound and another conventionally known monomer can be used. The conventionally known monomer is usually used in an amount of less than 10 mol % with respect to the vinyl ester monomer.

A viscosity average polymerization degree of the polyvinyl alcohol as a raw material of the polyvinyl acetal used in the present invention is not particularly limited, is appropriately selected in accordance with the application, but is preferably 150 to 3,000, more preferably 200 to 2,500, still more preferably 1,000 to 2,000. When the viscosity average polymerization degree of the polyvinyl alcohol is less than 150, strength tends to be insufficient when the resulting composition is made into a molded article. When the viscosity average polymerization degree of the polyvinyl alcohol is larger than 3,000, a handling property of the resulting composition tends to deteriorate.

The polyvinyl acetal used in the present invention can be synthesized, for example, under the following reaction conditions. However, the conditions are not limited thereto. First, the temperature of a polyvinyl alcohol aqueous solution having a concentration of 3 to 40% by mass is maintained in a range of 80 to 100° C. Thereafter, the temperature is gradually lowered over 10 to 60 minutes. When the temperature is lowered to −10 to 30° C., an aldehyde and an acid catalyst are added. While the temperature is maintained constant, an acetalization reaction is performed for 30 to 300 minutes (this temperature is referred to as a reaction temperature at the time of precipitation). At that time, a polyvinyl acetal the acetalization degree of which has reached a certain level is precipitated. Thereafter, the temperature of the reaction solution is raised to 30 to 80° C. over 30 to 300 minutes, and the temperature is maintained for 10 to 500 minutes (this temperature is referred to as a reaction temperature in the last stage). Subsequently, a neutralizing agent such as an alkali is added if necessary to the reaction solution to neutralize the acid catalyst. The resin is washed with water and dried to obtain the polyvinyl acetal used in the present invention.

The acid catalyst used for the acetalization reaction is not particularly limited. Either an organic acid or an inorganic acid can be used. Examples thereof include acetic acid, p-toluenesulfonic acid, nitric acid, sulfuric acid, and hydrochloric acid. Among these, hydrochloric acid, sulfuric acid, or nitric acid is preferably used.

The aldehyde used in the acetalization reaction of the present invention is not particularly limited. However, from viewpoints of easy acetalization and easy removal of aldehyde remaining after the reaction, the acetalization is performed preferably with an aldehyde having 1 to 8 carbon atoms, more preferably with an aldehyde having 4 to 6 carbon atoms, particularly preferably with n-butyl aldehyde. In the present invention, it is also possible to use a polyvinyl acetal obtained by using two or more aldehydes together.

The average acetalization degree of the polyvinyl acetal used in the present invention is not particularly limited. However, the average acetalization degree is preferably 66 to 78 mol %, more preferably 66.5 to 75 mol %, still more preferably 67 to 72 mol % from a viewpoint of excellent balance between transparency and mechanical strength. An average amount of remaining vinyl carboxylate groups is preferably 0.1 to 20 mol %, more preferably 0.3 to 13 mol %, still more preferably 0.5 to 10 mol % from viewpoints of excellent balance between transparency and mechanical strength and excellent durability when the composition of the present invention is used for a long time.

Next, the plasticizer used in the present invention will be described. By mixing 100 parts by mass of the polyvinyl acetal used in the present invention with the plasticizer used in the present invention in an amount of 30 to 70 parts by mass, preferably 33 to 68 parts by mass, more preferably 50 to 66 parts by mass, a transparent and plasticized composition is obtained. Specifically, the plasticizer includes a plasticizer containing a polar group in an amount of 0.5 to 100% by mass, preferably 2 to 100% by mass, more preferably 5 to 100% by mass, and a plasticizer containing no polar group in an amount of 0 to 99.5% by mass, preferably 0 to 98% by mass, more preferably 0 to 95% by mass. The total of the plasticizer containing a polar group and the plasticizer containing no polar group is 100% by mass. When the content of the plasticizer containing a polar group in the plasticizer is less than 0.5% by mass, transparency of the sheet obtained from the composition tends to be not sufficient. The phrase "The plasticizer used in the present invention includes a plasticizer containing a polar group in an amount of 100% by mass and a plasticizer containing no polar group in an amount of 0% by mass." means that the plasticizer used in the present invention includes only the plasticizer containing a polar group. In the composition of the present invention, when the composition of the present invention is treated under high humidity, for example, at 23° C. at 90% RH, the plasticizer containing a polar group prevents the composition of the present invention from being clouded or prevents the plasticizer containing no polar group from bleeding.

A compound to be used as a plasticizer containing a polar group is not particularly limited. The compound is not particularly limited as long as the compound has compatibility with the polyvinyl acetal used in the present invention, has a plasticizing effect on the polyvinyl acetal, and makes the polyvinyl acetals defined by the analysis values of HPLC compatible with each other. The compounds may be each used alone, or may be used in combination of two or more kinds thereof. Examples of the polar group include a hydroxyl group, a polyethyleneoxide group having a polymerization degree of 10 or more, a polypropylene oxide group having a polymerization degree of 10 or more, a carboxyl group, and an amino group. The plasticizer containing a polar group is particularly preferably a compound containing a hydroxyl group. When the plasticizer containing a polar group contains a hydroxyl group, a molecular weight thereof is not particularly limited. However, a compound having a molecular weight preferably of 200 to 2000, more preferably of 220 to 1000, still more preferably of 250 to 700, is used from a viewpoint of obtaining a sheet having excellent transparency in the present invention. A number average molecular weight based on a hydroxyl value of the compound containing a hydroxyl group is not particularly limited, but is preferably 200 to 2000, more preferably 220 to 1700, still more preferably 240 to 1500. When the number average molecular weight based on a hydroxyl value is less than 200, the boiling point of the compound may not be sufficiently high, and high volatility may be become a problem. When the number average molecular weight based on a hydroxyl value is more than 2000, the compatibility of the compound with the polyvinyl acetal may be insufficient. The number average molecular weight based on a hydroxyl value is obtained by (the number of hydroxyl groups per molecule of the compound containing a hydroxyl group)/(amount of substance [mol/g] of hydroxyl groups per g of the compound containing a hydroxyl group)=1000×(the number of hydroxyl groups per molecule of the compound containing a hydroxyl group)/((hydroxyl value of the compound containing a hydroxyl group)/56). Here, the number of hydroxyl groups per molecule of the compound containing a hydroxyl group when two or more kinds of the compounds containing a hydroxyl group are mixed and used refers to an average value per molecule of the compound containing a hydroxyl group included in the mixture.

The compound containing a hydroxyl group is not particularly limited as long as the compound contains one or more, preferably one to four, more preferably one to three hydroxyl groups. The compounds may be each used alone, or may be used in combination of two or more kinds thereof. In order to sufficiently obtain compatibility with and a plasticizing effect on the polyvinyl acetal, and an effect of obtaining a transparent sheet by making the polyvinyl acetal used in the present invention compatible, the compound containing a hydroxyl group is preferably an ester compound containing a hydroxyl group and/or an ether compound containing a hydroxyl group. The ester compound containing a hydroxyl group contains at least one ester bond and a hydroxyl group. The ether compound containing a hydroxyl group contains at least one ether bond and a hydroxyl group.

Specific examples of the ester compound containing a hydroxyl group include methyl ricinoleate, butyl ricinoleate, 2-ethylhexyl ricinoleate, (2-hydroxyethyl)ricinoleate, glycerin monoricinoleate, glycerin diricinoleate, glycerin triricinoleate, glycerin diricinoleate monooleate, (2-hydroxyethyl) oleate, (2-hydroxyethyl)2-ethylhexanoate, {2-[2-(2-hydroxyethoxy)ethoxy]ethyl}ricinoleate, {2-[2-(2-hydroxyethoxy)ethoxy]ethyl}2-ethylhexanoate, methyl ricinoleate, ethyl ricinoleate, butyl ricinoleate, octyl ricinoleate, octyl 6-hydroxy hexanoate, methyl 12-hydroxy stearate, castor oil, and a polyester compound containing a hydroxyl group. Among these, a polyester compound containing a hydroxyl group is preferably used from viewpoints of excellent compatibility with the polyvinyl acetal used in the present invention, an excellent plasticizing effect on the polyvinyl acetal, and a capability of obtaining a transparent sheet by making the polyvinyl acetal compatible. The castor oil is glycerin tricarboxylate derived from castor seeds. A ricinoleate occupies a majority of the carboxylic acid ester moieties, generally 80 to 95% by mass thereof. A palmitate, a stearate, an oleate, a linoleate, a linolenate, and the like occupy the remaining part.

The polyester compound containing a hydroxyl group (hereinafter, simply referred to as polyester (C)) is not particularly limited. However, examples thereof include a polyester (C-1) which is a condensation copolymer of a polyhydric alcohol and a polyvalent carboxylic acid and contains a hydroxyl group (hereinafter, simply referred to as polyester (C-1)), a polyester (C-2) which is a polymer of a hydroxycarboxylic acid and contains a hydroxyl group (hereinafter, simply referred to as polyester (C-2)), and a polycarbonate polyol (C-3) containing a hydroxyl group (hereinafter, simply referred to as polyester (C-3)).

Polyester (C-1) is obtained by carrying out condensation polymerization of a polyhydric alcohol and a polyvalent carboxylic acid while the polyhydric alcohol exists in an excessive amount. Examples of the polyhydric alcohol include an aliphatic dihydric alcohol such as 1,2-propanediol, 1,3-propanediol, 1,2-butanediol, 1,3-butanediol, 1,4-butanediol, 1,2-hexanediol, 3-methyl-1,5-pentanediol, 1,2-octanediol, 1,2-nonanediol, 1,8-nonanediol, 1,9-nonanediol, 1,2-cyclohexanediol, 1,2-cyclohexanedimethanol, 1,4-cyclohexanedimethanol, diethylene glycol, or triethylene glycol; an aliphatic trihydric alcohol such as glycerin; and an aliphatic tetrahydric alcohol such as erythritol or pentaerythritol. However, the polyhydric alcohol is not limited thereto. Among these, the aliphatic dihydric alcohol is preferable because the aliphatic dihydric alcohol has excellent weather resistance of polyester (C-1), excellent compatibility with the polyvinyl acetal, and an excellent plasticizing effect on the polyvinyl acetal.

Examples of the polyvalent carboxylic acid include an aliphatic divalent carboxylic acid such as succinic acid, glutaric acid, adipic acid, suberic acid, sebacic acid, dodecanedioic acid, or 1,2-cyclohexanedicarboxylic acid, an aliphatic trivalent carboxylic acid such as 1,2,3-propane tricarboxylic acid or 1,3,5-pentatricarboxylic acid, an aromatic dicarboxylic acid such as phthalic acid or terephthalic acid, and an aromatic trivalent carboxylic acid such as trimellitic acid. However, the polyvalent carboxylic acid is not limited thereto. Among these, an aliphatic divalent carboxylic acid, particularly an aliphatic divalent carboxylic acid having 6 to 10 carbon atoms is preferable from viewpoints of an excellent plasticizing effect of the resulting polyester on the polyvinyl acetal and a capability of obtaining a transparent sheet by making the polyvinyl acetal compatible. Unless contrary to the gist of the present invention, in addition to the polyhydric alcohol and the polyvalent carboxylic acid, a copolymer of a polyvalent carboxylic acid and a polyhydric alcohol, containing a hydroxyl group and obtained by using a monohydric alcohol and a monovalent carboxylic acid as a raw material, can be used.

Polyester (C-2) is obtained by carrying out condensation polymerization of a hydroxycarboxylic acid. Examples of the hydroxycarboxylic acid include glycolic acid, lactic acid, 2-hydroxybutanoic acid, 3-hydroxybutanoic acid, 4-hydroxybutanoic acid, 6-hydroxy hexanoic acid, and ricinoleic acid. A lactone compound obtained by carrying out intramolecular condensation of a hydroxycarboxylic acid can be also used as a raw material. Examples of the lactone compound include β-butyrolactone, δ-valerolactone, ε-caprolactone, and 4-methyl-δ-valerolactone. However, the lactone compound is not limited thereto. When the lactone compound is used, it is possible to obtain polyester (C-2) by ring-opening polymerization. Among these, 6-hydroxy carboxylic acid or ε-caprolactone is preferable from viewpoints of heat resistance of polyester (C-2), compatibility with the polyvinyl acetal, and a plasticizing effect thereon.

Examples of the ether compound containing a hydroxyl group include ethylene glycol monooctyl ether and a polyether compound containing a hydroxyl group. Among these, the polyether compound containing a hydroxyl group is preferably used from viewpoints of excellent compatibility with the polyvinyl acetal used in the present invention, an excellent plasticizing effect on the polyvinyl acetal, and making the polyvinyl acetal compatible. The polyether compound containing a hydroxyl group is a polymer of a polyhydric alcohol such as ethylene glycol or 1,2-propylene glycol, and contains a hydroxyl group. Preferable examples thereof include polyethylene glycol and polypropylene glycol.

Solubility in water of the plasticizer containing a polar group used in the present invention is not particularly limited. However, a water-insoluble plasticizer is preferable, because when a molded article obtained from the composition of the present invention comes in contact with water, the plasticizer containing a polar group is hardly eluted into the water. Being water-insoluble indicates that a dissolved amount in 100 g of water at 20° C. is 100 g or less, preferably 50 g or less, more preferably 10 g or less, still more preferably 2 g or less. The hydroxyl value of the compound containing a hydroxyl group used in the present invention is not particularly limited, but is preferably 50 to 600 mgKOH/g, more preferably 70 to 500 mgKOH/g, still more preferably 100 to 400 mgKOH/g. When the hydroxyl value is less than 50 mgKOH/g, a sheet obtained from the polyvinyl acetal composition of the present invention may have poor transparency. Meanwhile, when the hydroxyl value is more than 600 mgKOH/g, compatibility of the compound containing a hydroxyl group with the polyvinyl acetal may be lowered, transparency may be poor, or a molded article may bleed. Here, the hydroxyl value in the present invention is a value obtained by measurement by a method described in JIS K1557-1 (2007). When two or more kinds of the compounds containing a hydroxyl group are mixed and used, the hydroxyl value indicates a hydroxyl value of the mixture (mixture of compounds containing a hydroxyl group in the same mixing ratio as in the polyvinyl acetal composition of the present invention).

Examples of the plasticizer containing no polar group included in the plasticizer of the present invention include a plasticizer not containing such a polar group as a hydroxyl group, a polyethyleneoxide group having a polymerization degree of 10 or more, a polypropyleneoxide group having a polymerization degree of 10 or more, a carboxyl group, or an amino group. More specific examples thereof include an ester compound of a polyhydric alcohol and a monovalent carboxylic acid, containing no polar group, and an ester compound of a polyvalent carboxylic acid and a monohydric alcohol, containing no polar group. Examples of the ester compound of a polyhydric alcohol and a monovalent carboxylic acid, containing no polar group, include triethylene glycol di-2-ethylhexanoate and tetraethylene glycol di-2-ethylhexanoate. Examples of the ester compound of a polyvalent carboxylic acid and a monohydric alcohol, containing no polar group, include dihexyl adipate, dioctyl adipate, di(butoxyethyl)adipate, di(butoxyethoxyethyl)adipate, dibutyl sebacate, dioctyl sebacate, dioctyl phthalate, di(2-ethylhexyl)phthalate, di(octyl)cyclohexane dicarboxylate, and di(isononyl)cyclohexane dicarboxylate. Among these, a diester compound of a monovalent carboxylic acid and a compound selected from triethylene glycol and tetraethylene glycol such as triethylene glycol di-2-ethylhexanoate or tetraethylene glycol di-2-ethylhexanoate, containing no polar group, is preferable from viewpoints of a plasticizing effect on the polyvinyl acetal, low volatility, and the like.

The plasticizer used in the present invention is not particularly limited as long as the plasticizer includes 0.5 to 100% by mass of a plasticizer containing a polar group and 0 to 99.5% by mass of a plasticizer containing no polar group, and the total content of the plasticizer containing a polar group and the plasticizer containing no polar group is 100% by mass. The plasticizer includes, as the plasticizer containing a polar group, a compound containing a hydroxyl group in an amount of 0.5 to 5.0% by mass, preferably in an amount of 0.5 to 4.0% by mass, more preferably in an amount of 0.5 to 2.0% by mass, particularly preferably in an amount of 1.0 to 2.0% by mass, of the total content of the plasticizer, from a viewpoint of obtaining a composition having excellent balance between moisture resistance, mechanical strength, and the like. Furthermore, the plasticizer includes, as the plasticizer containing no polar group, a diester compound of a monovalent carboxylic acid and one or more kinds of compounds selected from triethylene glycol and tetraethylene glycol, containing no polar group, in an amount of 70 to 99.5% by mass, preferably in an amount of 90 to 99.5% by mass, more preferably in an amount of 95 to 99.5% by mass of the total content of the plasticizer. The total content of the plasticizer containing a polar group and the plasticizer containing no polar group is 100% by mass. When a plasticizer including, as the plasticizer containing no polar group, a diester compound of a monovalent carboxylic acid and triethylene glycol or tetraethylene glycol, containing no polar group, in an amount of 70 to 99.5% by mass of the total content of the plasticizer, is used, the plasticizer containing a polar group is preferably a compound containing a hydroxyl group and including a structure obtained by hydrolyzing either one of the two ester bonds included in the diester compound, that is, a compound containing one hydroxyl group and one ester bond, from a viewpoint of improving compatibility with the plasticizer containing a polar group.

The composition of the present invention may further include an antioxidant, an ultraviolet absorber, a plasticizer, an adhesion improver, and other additives unless contrary to the gist of the present invention.

When an antioxidant is added to the composition of the present invention, the kind thereof is not particularly limited. Examples thereof include a conventionally known phenolic antioxidant, phosphorus antioxidant, and sulfur antioxidant. Among these, the phenolic antioxidant is preferable, and an alkyl-substituted phenolic antioxidant is particularly preferable. These antioxidants can be each used alone or can be used in combination of two or more kinds thereof. An addition amount of the antioxidant is not particularly limited, but is 0.0001 to 5% by mass, preferably 0.001 to 1% by mass with respect to the mass of the composition. When the addition amount of the antioxidant is less than 0.0001% by mass, a sufficient effect may not be obtained. Even when the addition amount of the antioxidant is larger than 5% by mass, a remarkable effect cannot be expected.

When an ultraviolet absorber is added to the composition of the present invention, the kind thereof is not particularly limited. Examples thereof include a conventionally known benzotriazole ultraviolet absorber, anilide oxalate ultraviolet absorber, and benzoate ultraviolet absorber. These ultraviolet absorbers can be each used alone or can be used in combination of two or more kinds thereof. An addition amount of the ultraviolet absorber is not particularly limited, but is 0.0001 to 5% by mass, preferably 0.001 to 1% by mass with respect to the mass of the composition. When the addition amount of the ultraviolet absorber is less than 0.0001% by mass, a sufficient effect may not be obtained. Even when the addition amount of the ultraviolet absorber is larger than 5% by mass, a remarkable effect cannot be expected.

When a sheet obtained from the composition of the present invention is used for an application where it is necessary to appropriately adjust adhesion to glass, such as an interlayer film for laminated glass, an adhesion control agent may be added to the composition of the present invention. A conventionally known adhesion control agent can be used. Examples thereof include a sodium salt, a potassium salt, and a magnesium salt of an organic acid such as acetic acid, propionic acid, butanoic acid, hexanoic acid, 2-ethyl butanoic acid, or 2-ethylhexanoic acid. These salts may be each used alone, or may be added in combination of two or more kinds thereof. An addition amount thereof is preferably 0.0001 to 1% by mass, more preferably 0.0005 to 0.1% by mass, still more preferably 0.001 to 0.03% by mass with respect to the mass of the composition.

The composition of the present invention can be obtained by mixing the specific polyvinyl acetal defined in the present invention, a specific plasticizer, and other components by a conventionally known method. Examples thereof include a method in which components included in the composition of the present invention are dissolved in an organic solvent which can dissolve the components, and the organic solvent is then distilled off; and a method in which components included in the composition of the present invention are melt kneaded using an extruder or the like.

The glass transition temperature of the composition of the present invention is not particularly limited, and can be selected appropriately according a purpose. However, the glass transition temperature is preferably within a range of 0 to 50° C., more preferably of 0 to 45° C., still more preferably of 0 to 40° C. The glass transition temperature of the composition of the present invention within the above-described range is suitable particularly when the composition of the present invention is molded into a sheet to be used as an interlayer film for laminated glass.

The composition of the present invention has excellent transparency and flexibility. Therefore, the composition of the present invention is suitable as an interlayer film for laminated glass particularly when being molded into a sheet. In this case, the thickness of the sheet is not particularly limited, but is preferably 0.05 to 5.0 mm, more preferably 0.1 to 2.0 mm, still more preferably 0.1 to 1.2 mm from a viewpoint of use as the interlayer film for laminated glass.

When the sheet of the present invention is used as an interlayer film for laminated glass, glass to be used is not particularly limited. Examples thereof include inorganic glass such as float plate glass, polished plate glass, template glass, wire-reinforced plate glass, or heat-absorbing plate glass, and conventionally known organic glass such as polymethyl methacrylate or polycarbonate. These glass may be colorless or colored, and furthermore, may be transparent or non-transparent. These glass may be each used alone or may be used in combination of two or more kinds thereof. The thickness of the glass is not particularly limited, but, in general, is preferably 100 mm or less.

When the sheet of the present invention is used as an interlayer film for laminated glass, a shape of the outermost surface of the sheet is not particularly limited. However, an uneven structure is preferably formed on the outermost surface of a laminated product by a conventionally known method such as melt fracture or embossing from a viewpoint of a handling property (foam removing property) at the time of laminating the sheet with the glass.

The laminated glass of the present invention can be manufactured by a conventionally known method. Examples thereof include a method with a device such as a vacuum laminator, a vacuum bag, a vacuum ring, or a nip roll. In addition, a method of introducing a temporarily pressure-bonded product obtained by temporary pressure-bonding by the above-described method into an autoclave can be additionally carried out.

When a vacuum laminator is used, laminated glass can be manufactured, for example, under reduced pressure of $1 \times 10^{-6}$ to $3 \times 10^{-2}$ MPa, at 100 to 200° C., particularly at 130 to 160° C. A method of using a vacuum bag or a vacuum ring is described, for example, in European Patent No. 1235683. Laminated glass can be manufactured, for example, at about a pressure of $2 \times 10^{-2}$ MPa, at 130 to 145° C.

When a nip roll is used, for example, first temporary pressure-bonding is performed at a flow starting temperature of the composition of the present invention or lower, and then pressure-bonding is performed in conditions close to the flow starting temperature. Specifically, for example, a sheet made from the composition of the present invention is heated to 30 to 70° C. with an infrared heater or the like. Thereafter, the sheet is degassed with a roll. Subsequently, the sheet is heated to 50 to 120° C., and is then pressure-bonded by a roll to be bonded or temporarily bonded to glass.

An autoclaving step which may be performed additionally after temporary pressure-bonding depends on the thickness and the structure of laminated glass, but is performed, for example, under a pressure of 1.0 to 1.5 MPa, at 130 to 145° C. for 0.5 to 3 hours.

Hereinafter, the present invention will be described in more detail by way of Examples. However, the present invention is not limited to the following Examples.

Manufacturing Example 1

A 10 L (liter) glass container equipped with a reflux condenser, a thermometer, and an anchor type stirring blade was charged with 8100 g of ion-exchanged water and 660 g of polyvinyl alcohol (PVA-1: viscosity average polymerization degree: 1700, saponification degree: 99 mol %) (PVA concentration: 7.5%). The temperature of the contents was raised to 95° C., and the contents were completely dissolved. Subsequently, while the contents were stirred at 120 rpm, the temperature thereof was gradually lowered to 5° C. over about 30 minutes. Thereafter, 384 g of butylaldehyde and 540 mL of 20% hydrochloric acid were added thereto, and a butyralization reaction was performed for 150 minutes. Thereafter, the temperature was raised to 50° C. over 60 minutes, was maintained at 50° C. for 120 minutes, and was lowered to room temperature. After a precipitated resin was washed with ion-exchanged water, an excessive amount of sodium hydroxide aqueous solution was added thereto to neutralize a remaining acid. The resin was further washed again with excessive water, and dried to obtain polyvinyl butyral (PVB-1). When properties of the resulting PVB-1 were measured in accordance with JIS K6728, an average butyralization degree (average acetalization degree) was 69 mol %, the content of remaining vinyl acetate groups was 1 mol %, and an average amount of remaining hydroxyl groups was 30 mol % (refer to Table 1).

Manufacturing Example 2

A 10 L (liter) glass container equipped with a reflux condenser, a thermometer, and an anchor type stirring blade was charged with 8100 g of ion-exchanged water and 723 g of polyvinyl alcohol (PVA-2: viscosity average polymerization degree: 1700, saponification degree: 92 mol %) (PVA concentration: 8.2%). The temperature of the contents was raised to 95° C., and the contents were completely dissolved. Subsequently, while the contents were stirred at 120 rpm, the temperature thereof was gradually lowered to 5° C. over about 30 minutes. Thereafter, 453 g of butylaldehyde and 540 mL of 20% hydrochloric acid were added thereto, and a butyralization reaction was performed for 150 minutes. Thereafter, the temperature was raised to 65° C. over 60 minutes, was maintained at 65° C. for 120 minutes, and was lowered to room temperature. After a precipitated resin was washed with ion-exchanged water, an excessive amount of sodium hydroxide aqueous solution was added thereto to neutralize a remaining acid. The resin was further washed with excessive water, and dried to obtain polyvinyl butyral (PVB-2). When properties of the resulting PVB-2 were measured in accordance with JIS K6728, an average butyralization degree (average acetalization degree) was 74 mol %, the content of remaining vinyl acetate groups was 6 mol %, and an average amount of remaining hydroxyl groups was 20 mol % (refer to Table 1).

Manufacturing Example 3

A 10 L (liter) glass container equipped with a reflux condenser, a thermometer, and an anchor type stirring blade was charged with 8100 g of ion-exchanged water and 723 g of polyvinyl alcohol (PVA-3: viscosity average polymerization degree: 1700, saponification degree: 89 mol %) (PVA concentration: 8.2%). The temperature of the contents was raised to 95° C., and the contents were completely dissolved. Subsequently, while the contents were stirred at 120 rpm, the temperature thereof was gradually lowered to 5° C. over about 30 minutes. Thereafter, 430 g of butylaldehyde and 540 mL of 20% hydrochloric acid were added thereto, and a butyralization reaction was performed for 150 minutes. Thereafter, the temperature was raised to 58° C. over 60 minutes, was maintained at 58° C. for 120 minutes, and was lowered to room temperature. After a precipitated resin was washed with ion-exchanged water, an excessive amount of sodium hydroxide aqueous solution was added thereto to neutralize a remaining acid. The resin was further washed with excessive water, and dried to obtain polyvinyl butyral (PVB-3). When properties of the resulting PVB-3 were measured in accordance with JIS K6728, an average butyralization degree (average acetalization degree) was 69 mol %, the content of remaining vinyl acetate groups was 9 mol %, and a content of vinyl alcohol groups (average amount of remaining hydroxyl groups) was 22 mol % (refer to Table 1).

Manufacturing Example 4

A 10 L (liter) glass container equipped with a reflux condenser, a thermometer, and an anchor type stirring blade was charged with 8100 g of ion-exchanged water and 723 g of polyvinyl alcohol (PVA-4: viscosity average polymerization degree: 1700, saponification degree: 86 mol %) (PVA concentration: 8.2%). The temperature of the contents was raised to 95° C., and the contents were completely dissolved. Subsequently, while the contents were stirred at 120 rpm, the temperature thereof was gradually lowered to 5° C. over about 30 minutes. Thereafter, 427 g of butylaldehyde and 540 mL of 20% hydrochloric acid were added thereto, and a butyralization reaction was performed for 150 minutes. Thereafter, the temperature was raised to 66° C. over 60 minutes, was maintained at 66° C. for 110 minutes, and was lowered to room temperature. After a precipitated resin was washed with ion-exchanged water, an excessive amount of sodium hydroxide aqueous solution was added thereto to neutralize a remaining acid. The resin was further washed with excessive water, and dried to obtain polyvinyl butyral (PVB-4). When properties of the resulting PVB-4 were measured in accordance with JIS K6728, an average butyralization degree (average acetalization degree) was 68 mol %, the content of remaining vinyl acetate groups was 12 mol %, and a content of vinyl alcohol groups was 20 mol % (refer to Table 1).

Manufacturing Example 5

PVB-5 was obtained in a similar manner to the preparation of the PVB-1 except that the use amount of butylaldehyde was changed to 395 g. When properties of the resulting PVB-5 were measured in accordance with JIS K6728, an average butyralization degree (average acetalization degree) was 71 mol %, the content of remaining vinyl acetate groups was 1 mol %, and a content of vinyl alcohol groups was 28 mol % (refer to Table 1).

Manufacturing Example 6

PVB-6 was obtained in a similar manner to the preparation of the PVB-4 except that the use amount of butylaldehyde was changed to 440 g. When properties of the resulting PVB-6 were measured in accordance with JIS K6728, an average butyralization degree (average acetalization degree) was 70 mol %, the content of remaining vinyl acetate groups was 12 mol %, and a content of vinyl alcohol groups was 18 mol % (refer to Table 1).

Manufacturing Example 7

PVB-7 was obtained in a similar manner to the preparation of the PVB-1 except that the use amount of butylaldehyde was changed to 350 g. When properties of PVB-7 were measured in accordance with JIS K6728, an average butyralization degree (average acetalization degree) was 63 mol %, the content of remaining vinyl acetate groups was 1 mol %, and a content of vinyl alcohol groups was 36 mol % (refer to Table 1).

Manufacturing Example 8

PVB-8 was obtained in a similar manner to the preparation of the PVB-2 except that the use amount of butylaldehyde was changed to 467 g. When properties of PVB-8 were measured in accordance with JIS K6728, an average butyralization degree (average acetalization degree) was 74 mol %, the content of remaining vinyl acetate groups was 9 mol %, and a content of vinyl alcohol groups was 17 mol % (refer to Table 1).

Manufacturing Example 9

PVB-9 was obtained in a similar manner to the preparation of the PVB-1 except that the use amount of butylaldehyde was changed to 524 g. When PVB-9 was measured in accordance with JIS K6728, an average butyralization degree (average acetalization degree) was 82 mol %, the content of remaining vinyl acetate groups was 1 mol %, and a content of vinyl alcohol groups was 17 mol % (refer to Table 1).

TABLE 1

| | average butyralization degree (mol %) | content of remaining vinyl acetate groups (mol %) | average amount of remaining hydroxyl groups (mol %) |
|---|---|---|---|
| PVB-1 | 69 | 1 | 30 |
| PVB-2 | 74 | 6 | 20 |
| PVB-3 | 69 | 9 | 22 |
| PVB-4 | 68 | 12 | 20 |
| PVB-5 | 71 | 1 | 28 |
| PVB-6 | 70 | 12 | 18 |
| PVB-7 | 63 | 1 | 36 |
| PVB-8 | 74 | 9 | 17 |
| PVB-9 | 82 | 1 | 17 |

Example 1

Using a labo plastomill, 100 parts by mass of polyvinyl acetal-1 (mixture in a mass ratio of PVB-1:PVB-2=80:20) and 50 parts by mass of castor oil (glycerin tricarboxylate, % by mass of the carboxylic acid ester moieties: ricinoleate, 13% by mass thereof: any one of a palmitate, a stearate, an oleate, a linoleate, and a linolenate, 1% by mass thereof: other carboxylic acid esters; the number of hydroxyl groups per molecule: 2.6, hydroxyl value: 160 mgKOH/g, average molecular weight based on hydroxyl value: 910) were melt kneaded (150° C., 5 minutes) with a labo plastomill to obtain composition-1. The composition is shown in Table 4. Composition-1 was hot pressed (150° C., 30 minutes) to obtain sheet-1 of 10 cm×10 cm×0.8 mm. The water content of sheet-1 was adjusted to 0.5% (maintained at 20° C. at RH 30% for 24 hours). Thereafter, sheet-1 was temporarily pressure-bonded in a vacuum bag while being sandwiched between two glass plates of 10 cm×10 cm×3.2 mm. Thereafter, sheet-1 was treated in an autoclave at 140° C. at 1.2 MPa for 40 minutes to obtain laminated glass-1.

(Analysis of Polyvinyl Acetal-1 by HPLC)

(1) Adjustment of Analysis Sample

Into a pressure-resistant test tube, 100 mg of a polyvinyl acetal and 20 mL of ethanol (99.5%) were added. The test tube was completely sealed. Thereafter, the test tube was soaked in a shaking type isothermal water bath. A treatment was performed at 70° C. for 4 hours while the test tube was shaken, and the polyvinyl acetal was dissolved (at the time of 3.5 hours, the polyvinyl acetal was completely dissolved). After being cooled at room temperature, the resulting solution was filtered through a hydrophilic PTFE membrane filter having a pore diameter of 0.45 μm and a diameter of 13 mm to obtain an HPLC test solution.

Width: 30 seconds from immediately after the injection of the sample, 200 seconds after 5 minutes until the end Slope: 50 μm Drift: 0 μV/minute T.DBL: 0 minute Minimum area: 10,000 counts The baseline was determined by analyzing a blank test solution prepared by a similar method to the adjustment of the analysis sample except that a polyvinyl acetal was dissolved. Results are shown in Table 2. In this analysis, any other peak than the first peak and the second peak derived from polyvinyl acetals was not detected.

TABLE 2

| | polyvinyl acetal (100 parts) | | elution time (minute) | | | ratio between square roots of areas of mountains*1 | ratio of sum of square roots of areas of mountains*2 |
|---|---|---|---|---|---|---|---|
| | | | first peak $t_{12}$ | second peak $t_{22}$ | $t_{22}-t_{12}$ | | |
| Example 1 | PVB-1 (80 parts) | PVB-2 (20 parts) | 19.7 | 23.0 | 3.3 | 79:21 | 100 |
| Example 2 | PVB-1 (80 parts) | PVB-2 (20 parts) | 19.7 | 23.0 | 3.3 | 80:20 | 100 |
| Example 3 | PVB-1 (80 parts) | PVB-2 (20 parts) | 19.7 | 23.0 | 3.3 | 80:20 | 100 |
| Example 4 | PVB-1 (80 parts) | PVB-2 (20 parts) | 19.7 | 23.0 | 3.3 | 80:20 | 100 |
| Example 5 | PVB-1 (80 parts) | PVB-2 (20 parts) | 19.7 | 23.0 | 3.3 | 80:20 | 100 |
| Example 6 | PVB-1 (80 parts) | PVB-2 (20 parts) | 19.7 | 23.0 | 3.3 | 79:21 | 100 |
| Example 7 | PVB-1 (70 parts) | PVB-2 (30 parts) | 19.7 | 23.0 | 3.3 | 70:30 | 100 |
| Example 8 | PVB-1 (50 parts) | PVB-2 (50 parts) | 19.7 | 23.0 | 3.3 | 51:49 | 100 |
| Example 9 | PVB-1 (10 parts) | PVB-2 (90 parts) | 19.7 | 23.0 | 3.3 | 10:90 | 100 |
| Example 10 | PVB-1 (90 parts) | PVB-2 (10 parts) | 19.7 | 23.0 | 3.3 | 90:10 | 100 |
| Example 11 | PVB-1 (80 parts) | PVB-3 (20 parts) | 19.7 | 22.5 | 2.8 | 80:20 | 100 |
| Example 12 | PVB-1 (80 parts) | PVB-4 (20 parts) | 19.7 | 23.8 | 4.1 | 78:22 | 100 |
| Example 13 | PVB-1 (10 parts) | PVB-5 (90 parts) | 19.7 | 20.8 | 1.1 | 10:90 | 100 |
| Example 14 | PVB-1 (90 parts) | PVB-5 (10 parts) | 19.7 | 20.8 | 1.1 | 89:11 | 100 |
| Example 15 | PVB-4 (10 parts) | PVB-6 (90 parts) | 23.8 | 25.0 | 1.2 | 10:90 | 100 |
| Example 16 | PVB-4 (90 parts) | PVB-6 (10 parts) | 23.8 | 25.0 | 1.2 | 91:9 | 100 |
| Example 17 | PVB-7 (20 parts) | PVB-1 (80 parts) | 16.2 | 19.7 | 3.5 | 20:80 | 100 |
| Example 18 | PVB-7 (40 parts) | PVB-2 (60 parts) | 16.2 | 23.0 | 6.8 | 41:59 | 100 |
| Example 19 | PVB-1 (80 parts) | PVB-8 (20 parts) | 19.7 | 25.5 | 5.8 | 80:20 | 100 |
| Example 20 | PVB-1 (80 parts) | PVB-9 (20 parts) | 19.7 | 26.0 | 6.3 | 79:21 | 100 |
| Comparative Example 1 | PVB-1 (80 parts) | PVB-2 (20 parts) | 19.7 | 23.0 | 3.3 | 79:21 | 100 |
| Comparative Example 2 | PVB-1 (80 parts) | PVB-3 (20 parts) | 19.7 | 22.5 | 2.8 | 80:20 | 100 |
| Comparative Example 3 | PVB-1 (90 parts) | PVB-5 (10 parts) | 19.7 | 20.8 | 1.1 | 90:10 | 100 |
| Comparative Example 4 | PVB-4 (90 parts) | PVB-6 (10 parts) | 23.8 | 25.0 | 1.2 | 89:11 | 100 |

*1 a square root of an area of a mountain with the first peak: a square root of an area of a mountain with the second peak
*2 a ratio of the sum of a square root of an area of a mountain with the first peak and a square root of an area of a mountain with the second peak with respect to the sum of the square roots of the areas of all the mountains (2) HPLC Measurement "Prominence" manufactured by Shimadzu Corporation was used as an HPLC system. "Shim-pack G-ODS (4)" (ODS column having an inner diameter of 4 mm and a length of 1 cm) manufactured by Shimadzu Corporation was used as an HPLC column. "ELSD-LT II" manufactured by Shimadzu Corporation was used as a detector. HPLC analysis was carried out by the following method. While an inside of an HPLC system is filled with a mixed solvent (ethanol/water=4/1 (v/v)) (hereinafter, referred to as a mobile phase (A)), a 30 μL of an ethanol solution including 0.5% by mass of a polyvinyl acetal was injected as a sample. At a column temperature of 45° C. at a flow rate of 0.4 mL/min, the ratio of ethanol in the mobile phase was increased at a constant speed (5 vol %/min) over 20 minutes from immediately after the injection of the sample. On and after 20 minutes (at this time, mobile phase (A) was completely replaced by ethanol), ethanol alone was used as a mobile phase. Nitrogen gas was used as nebulizer gas of the detector (gas supply pressure=350 kPa, spray temperature 35° C.). The obtained data was analyzed under the following conditions using "Lab-Solutions LC (ver. 5.42 SP3)" manufactured by Shimadzu Corporation.

(Titration Analysis of Ethanol Solution with Hexane and Deionized Water)

A clear solution was obtained by dissolving 1 g of polyvinyl acetal-1 in 100 g of ethanol. The solution was titrated with hexane while the solution was stirred at 23° C. When the dropping amount reached 181 mL, the solution became clouded. Meanwhile, a clear solution was obtained by dissolving 1 g of polyvinyl acetal-1 in 100 g of ethanol. The solution was titrated with deionized water while the solution was stirred at 23° C. When the dropping amount reached 28 mL, the solution became clouded. Results are shown in Table 3.

(Analysis of Undissolved Content when Polyvinyl Acetal-1 was Dissolved in Methanol)

When 1 g of polyvinyl acetal-1 was dissolved in 100 g of methanol, an undissolved content was 19%. To 100 g of methanol, 1 g of polyvinyl acetal-1 having a major axis of each particle or each lump of 3 mm or less was added such that polyvinyl acetal-1 did not become agglomerated while the methanol was stirred. After a treatment at 25° C. for 72 hours, a resulting solution (including an undissolved fragment) was subjected to filtration under reduced pressure at a differential pressure of 0.010±0.002 MPa using filter paper classified into five A defined in JIS P3801. The undissolved content was determined by measuring a dry mass of the components remaining on the filter paper. Results are shown in Table 3.

(Analysis of Undissolved Content when Polyvinyl Acetal-1 was Dissolved in Chloroform)

When 1 g of polyvinyl acetal-1 was dissolved in 100 g of chloroform, an undissolved content was 0%. To 100 g of chloroform, 1 g of polyvinyl acetal-1 having a major axis of each particle or each lump of 3 mm or less was added such that polyvinyl acetal-1 did not become agglomerated while the chloroform was stirred. After a treatment at 25° C. for 72 hours, a resulting solution (including an undissolved fragment) was subjected to filtration under reduced pressure at a differential pressure of 0.010±0.002 MPa using filter paper classified into five A defined in JIS P3801. The undissolved content was determined by measuring a dry mass of the components remaining on the filter paper. Results are shown in Table 3.

TABLE 3

| | dropping amount of hexane (mL) | dropping amount of deionized water (mL) | undissolved content in methanol (% by mass) | undissolved content in chloroform (% by mass) |
|---|---|---|---|---|
| Example 1 | 181 | 28 | 19 | 0 |
| Example 2 | 181 | 28 | 19 | 0 |
| Example 3 | 181 | 28 | 19 | 0 |
| Example 4 | 181 | 28 | 19 | 0 |
| Example 5 | 181 | 28 | 19 | 0 |
| Example 6 | 181 | 28 | 19 | 0 |
| Example 7 | 181 | 28 | 29 | 0 |
| Example 8 | 181 | 28 | 48 | 0 |
| Example 9 | 181 | 28 | 86 | 0 |
| Example 10 | 181 | 28 | 9 | 0 |
| Example 11 | 181 | 32 | 19 | 0 |
| Example 12 | 181 | 31 | 19 | 0 |
| Example 13 | 181 | 40 | 0 | 0 |
| Example 14 | 181 | 40 | 0 | 0 |
| Example 15 | 224 | 25 | 95 | 0 |
| Example 16 | 224 | 25 | 95 | 0 |
| Example 17 | 143 | 41 | 0 | 15 |
| Example 18 | 143 | 41 | 0 | 30 |
| Example 19 | 181 | 17 | 19 | 0 |
| Example 20 | 181 | 12 | 20 | 0 |
| Comparative Example 1 | 181 | 28 | 19 | 0 |
| Comparative Example 2 | 181 | 32 | 19 | 0 |
| Comparative Example 3 | 181 | 40 | 19 | 0 |
| Comparative Example 4 | 224 | 25 | 0 | 0 |

(Evaluation of Sheet made from Composition: tan δ)

Sheet-1 was cut with a width of 3 mm, and dynamic viscoelasticity was measured using RSA-G2 manufactured by TA Instruments Japan Inc. (pulling mode, frequency: 0.3 Hz, The measurement was started from −20° C., and the temperature was raised at 3° C./min. The measurement was terminated when the temperature reached 100° C.). Temperature at which tan δ was maximized within the measurement range (peak temperature of tan δ, i.e., glass transition temperature in the present invention) was 26° C. Results are shown in Table 5.

(Evaluation of Sheet Made from Composition: Cloudiness During Water Absorption, Bleeding)

After sheet-1 was allowed to stand at 23° C. at 90% RH for two weeks, existence of cloudiness and existence of bleeding were checked. Neither thereof were observed. Results are shown in Table 5.

(Evaluation of Laminated Glass: Haze)

Haze of laminated glass-1 was measured using a haze meter (HZ-1) manufactured by Suga Test Instruments Co., Ltd. The haze was 0.6%. Results are shown in Table 5.

(Evaluation of Laminated Glass: Cloudiness at the Time of Irradiation with Light)

Laminated glass-1 was irradiated with light of 2700 lumens from a direction perpendicular to a surface of laminated glass-1 from a position 20 cm away therefrom. Existence of cloudiness in a part irradiated with light was checked from an obliquely upper side of the laminated glass by visual observation. Cloudiness was not observed. Results are shown in Table 5.

Examples 2 to 20, Comparative Examples 1 to 4

Polyvinyl acetals were mixed in the compositions shown in Table 4 by a similar method to Example 1 to obtain polyvinyl acetals-2 to 20 and comparative polyvinyl acetals-1 to 4. An HPLC measurement thereof was performed. Results are shown in Table 2. Similarly, a polyvinyl acetal dissolved in ethanol was titrated with hexane or deionized water. An undissolved content was measured when a polyvinyl acetal was dissolved in methanol or chloroform. Results are shown in Table 3. Furthermore, a polyvinyl acetal, a compound containing a hydroxyl group, and a compound containing no hydroxyl group were mixed in the compositions shown in Table 4 in a similar manner to Example 1 to obtain compositions-2 to 20 and comparative compositions-1 to 4. Furthermore, sheets-2 to 20, comparative sheets 1 to 4, laminated glass-2 to 20, and comparative laminated glass-1 to 4 were obtained from these compositions in a similar manner to Example 1. The resulting sheets and laminated glass were evaluated in a similar manner to Example 1. Results are shown in Table 5. In the analysis of the polyvinyl acetals used in Examples and Comparative Examples, any other peak than the first peak and the second peak derived from polyvinyl acetals was not detected.

TABLE 4

| | polyvinyl acetal (parts by mass) | | compound containing a hydroxyl group (parts by mass) | plasticizer containing no hydroxyl group (parts by mass) |
|---|---|---|---|---|
| Example 1 | PVB-1(80) | PVB-2(20) | castor oil (50) | |
| Example 2 | PVB-1(80) | PVB-2(20) | castor oil (40) | |
| Example 3 | PVB-1(80) | PVB-2(20) | castor oil (30) | 3GO(10) |
| Example 4 | PVB-1(80) | PVB-2(20) | polyester polyol*1 (40) | |
| Example 5 | PVB-1(80) | PVB-2(20) | polyester polyol*1 (20) | 3GO(20) |
| Example 6 | PVB-1(80) | PVB-2(20) | polypropylene glycol*2 (40) | |
| Example 7 | PVB-1(70) | PVB-2(30) | castor oil (50) | |
| Example 8 | PVB-1(50) | PVB-2(50) | castor oil (50) | |
| Example 9 | PVB-1(10) | PVB-2(90) | castor oil (50) | |

TABLE 4-continued

|  | polyvinyl acetal (parts by mass) | | compound containing a hydroxyl group (parts by mass) | plasticizer containing no hydroxyl group (parts by mass) |
|---|---|---|---|---|
| Example 10 | PVB-1(90) | PVB-2(10) | castor oil (50) | |
| Example 11 | PVB-1(80) | PVB-3(20) | castor oil (50) | |
| Example 12 | PVB-1(80) | PVB-4(20) | castor oil (50) | |
| Example 13 | PVB-1(10) | PVB-5(90) | 3GO monoester*3 (0.4) | 3GO(37) |
| Example 14 | PVB-1(90) | PVB-5(10) | 3GO monoester*3 (0.4) | 3GO(39) |
| Example 15 | PVB-4(10) | PVB-6(90) | 3GO monoester*3 (0.4) | 3GO(37) |
| Example 16 | PVB-4(90) | PVB-6(10) | 3GO monoester*3 (0.4) | 3GO(37) |
| Example 17 | PVB-7(20) | PVB-1(80) | polyester polyol*1 (45) | |
| Example 18 | PVB-7(40) | PVB-2(60) | polypropylene glycol*2 (40) | |
| Example 19 | PVB-1(80) | PVB-8(20) | castor oil (50) | |
| Example 20 | PVB-1(80) | PVB-9(80) | castor oil (50) | |
| Comparative Example 1 | PVB-1(80) | PVB-2(20) | | 3GO(40) |
| Comparative Example 2 | PVB-1(80) | PVB-3(20) | | 3GO(40) |
| Comparative Example 3 | PVB-1(90) | PVB-5(10) | | 3GO(37) |
| Comparative Example 4 | PVB-4(90) | PVB-6(10) | | 3GO(37) |

*1 alternating copolymer of adipic acid and 3-methyl-1,5-pentanediol the number of hydroxyl groups per molecule = 2, average molecular weight based on hydroxyl value = 500 average hydroxyl value obtained by JIS K1557-1 (2007) = 224 mgKOH/g, melting point lower than −20° C.
*2 compound obtained by addition polymerization of 1,2-propylenediol and propyleneoxide the number of hydroxyl groups per molecule = 2, average molecular weight based on hydroxyl value = 500 average hydroxyl value obtained by JIS K1557-1 (2007) = 224 mgKOH/g, melting point lower than −20° C.
*3 {2-[2-(2-hydroxyethoxy)ethoxy]ethyl}2-ethylhexanoate

TABLE 5

| | evaluation of sheet | | | evaluation of laminated glass | |
|---|---|---|---|---|---|
| | peak temperature | 23° C., 90% RH, after two weeks | | | cloudiness at the time of irradiation with |
| | of tanδ (° C.) | cloudiness (%) | bleeding | haze (%) | light |
| Example 1 | 27 | not observed | not observed | 0.6 | not observed |
| Example 2 | 31 | not observed | not observed | 0.7 | not observed |
| Example 3 | 28 | not observed | not observed | 0.9 | not observed |
| Example 4 | 26 | not observed | not observed | 0.6 | not observed |
| Example 5 | 24 | not observed | not observed | 0.8 | not observed |
| Example 6 | 25 | not observed | not observed | 0.5 | not observed |
| Example 7 | 25 | not observed | not observed | 0.7 | not observed |
| Example 8 | 22 | not observed | not observed | 0.9 | not observed |
| Example 9 | 22 | not observed | not observed | 0.7 | not observed |
| Example 10 | 28 | not observed | not observed | 0.6 | not observed |
| Example 11 | 27 | not observed | not observed | 0.6 | not observed |
| Example 12 | 28 | not observed | not observed | 0.7 | not observed |
| Example 13 | 26 | not observed | not observed | 0.7 | not observed |
| Example 14 | 26 | not observed | not observed | 0.7 | not observed |
| Example 15 | 22 | not observed | not observed | 0.9 | not observed |
| Example 16 | 23 | not observed | not observed | 0.8 | not observed |
| Example 17 | 31 | not observed | not observed | 0.8 | not observed |
| Example 18 | 29 | not observed | not observed | 0.9 | not observed |
| Example 19 | 27 | not observed | not observed | 0.8 | not observed |
| Example 20 | 26 | not observed | not observed | 0.9 | not observed |
| Comparative Example 1 | 26 | observed | observed | 9.4 | observed |
| Comparative Example 2 | 27 | observed | observed | 11.5 | observed |
| Comparative Example 3 | 26 | slightly observed | observed | 1.4 | observed |
| Comparative Example 4 | 23 | slightly observed | observed | 1.3 | observed |

The invention claimed is:
1. A composition, comprising:
100 parts by mass of a polyvinyl acetal; and
30 to 70 parts by mass of a plasticizer comprising 0.5 to 100% by mass of a first plasticizer and 0 to 99.5% by mass of a second plasticizer, a total of the first plasticizer and the second plasticizer being 100% by mass,
wherein the first plasticizer comprises a hydroxyl group and is an ester compound,
wherein the second plasticizer is a compound that does not comprise a polar group selected from the group consisting of a hydroxyl group, a polyethylene oxide group having a polymerization degree of 10 or more, a polypropylene oxide group having a polymerization degree of 10 or more, a carboxyl group, and an amino group, and
wherein when the polyvinyl acetal is analyzed by high performance liquid chromatography using a column having an inner diameter of 4 mm and a length of 1 cm, the polyvinyl acetal exhibits a first peak and a second peak derived from polyvinyl acetals, the column being filled with spherical silica gel surface-modified with an octadecylsilyl group, serving as a stationary phase,
wherein the polyvinyl acetal is a mixture of polyvinyl acetal (A) and polyvinyl acetal (B) having different average amounts of remaining hydroxyl groups.

2. The composition according to claim 1, wherein a difference in elution time between the first peak and the second peak is 2 to 10 minutes.

3. The composition according to claim 1, wherein the first peak is exhibited at less than 22 minutes of an elution time, and the second peak is exhibited at 22 minutes or more of the elution time.

4. The composition according to claim 1, wherein a ratio between a square root of an area of the first peak and a square root of an area of the second peak is in a range of 20:80 to 98:2,
wherein the area of the first peak is measured from the baseline immediately before the elution of the first peak to the baseline immediately after the elution of the first peak or, where the first peak and the second peak overlap, from immediately before the elution of the first peak to an intersection with the second peak, and
wherein the area of the second peak is measured from the baseline immediately before the elution of the second peak to the baseline immediately after the elution of the second peak or, where the first peak and the second peak overlap, from the intersection with the first peak to the baseline immediately after the elution of the second peak.

5. The composition according to claim 1, wherein the first peak and the second peak have the largest area and the second largest area among all of the peaks derived from polyvinyl acetals,
wherein the first peak has an elution time less than the second peak, and
wherein a sum of a square root of the first peak and a square root of the second peak is 50 to 100% with respect to the sum of the square roots of the areas of all of the peaks derived from polyvinyl acetals.

6. The composition according to claim 1, wherein when a solution obtained by dissolving 1 g of the polyvinyl acetal in 100 g of ethanol is titrated with hexane, a dropping amount of hexane until the solution becomes clouded is 140 mL or more.

7. The composition according to claim 1, wherein when a solution obtained by dissolving 1 g of the polyvinyl acetal in 100 g of ethanol is titrated with deionized water, a dropping amount of deionized water until the solution becomes clouded is 10 mL or more.

8. The composition according to claim 1, wherein the first plasticizer is a compound having a molecular weight of 200 to 2000.

9. The composition according to claim 1, wherein the first plasticizer has a number average molecular weight based on a hydroxyl value of 200 to 2000.

10. The composition according to claim 1, wherein the plasticizer comprises:
from 0.5 to 5% by mass of the first plasticizer; and
from 70 to 99.5% by mass of the second plasticizer, which is a diester compound of a monovalent carboxylic acid and a compound selected from the group consisting of triethylene glycol and tetraethylene glycol.

11. The composition according to claim 1, wherein when the average amount of remaining hydroxyl groups of polyvinyl acetal (A) is X mol % and the average amount of remaining hydroxyl groups of polyvinyl acetal (B) is Y mol %, $|X-Y| \geq 1$ mol %.

12. The composition according to claim 11, wherein X=27.0 to 33.0, Y=15.0 to 27.0, and the polyvinyl acetal satisfies a condition 1:
condition 1: when 1 g of a polyvinyl acetal is dissolved in 100 g of methanol, an undissolved content is 2.5 to 90% by mass.

13. The composition according to claim 11, wherein X=27.0 to 33.0, Y=33.0 to 50.0, and the polyvinyl acetal satisfies a condition 2:
condition 2: when 1 g of a polyvinyl acetal is dissolved in 100 g of chloroform, an undissolved content is 5 to 70% by mass.

14. The composition according to claim 11, wherein X=15.0 to 27.0, Y=33.0 to 50.0, and the polyvinyl acetal satisfies conditions 1 and 2:
condition 1: when 1 g of a polyvinyl acetal is dissolved in 100 g of methanol, an undissolved content is 2.5 to 90% by mass:
condition 2: when 1 g of a polyvinyl acetal is dissolved in 100 g of chloroform, an undissolved content is 5 to 70% by mass.

15. The composition according to claim 1, wherein a mixing ratio by mass of polyvinyl acetal (A) and polyvinyl acetal (B) is in a range of 20:80 t 98:2.

16. The composition according to claim 1, wherein an average amount of remaining hydroxyl groups of the polyvinyl acetal is 20 to 33 mol %.

17. A sheet comprising the composition according to claim 1.

18. A laminated glass comprising the sheet according to claim 17.

19. The laminated glass according to claim 18, wherein the laminated glass has haze of 0.01 to 2%.

* * * * *